US012553395B2

(12) United States Patent
DeVries et al.

(10) Patent No.: US 12,553,395 B2
(45) Date of Patent: Feb. 17, 2026

(54) WORK VEHICLE POWER SYSTEM WITH DYNAMIC AUTO-IGNITION ASSISTANCE COMPRESSION RATIOS

(71) Applicant: Deere & Company, Moline, IL (US)

(72) Inventors: Kevin B. DeVries, Cedar Falls, IA (US); Craig W. Lohmann, Cedar Falls, IA (US); Danan Dou, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/145,524

(22) Filed: Dec. 22, 2022

(65) Prior Publication Data
US 2024/0209805 A1 Jun. 27, 2024

(51) Int. Cl.
| | |
|---|---|
| *F02D 15/02* | (2006.01) |
| *B62D 49/06* | (2006.01) |
| *F02B 9/02* | (2006.01) |
| *F02B 75/04* | (2006.01) |
| *F02B 75/18* | (2006.01) |
| *F02D 41/06* | (2006.01) |

(52) U.S. Cl.
CPC .............. *F02D 15/02* (2013.01); *B62D 49/06* (2013.01); *F02B 9/02* (2013.01); *F02B 75/045* (2013.01); *F02B 75/18* (2013.01); *F02D 41/062* (2013.01)

(58) Field of Classification Search
CPC .......... F02D 41/062; F02D 15/02; F02B 9/02; F02B 75/045; F02B 75/18
See application file for complete search history.

(56) References Cited

U.S. PATENT DOCUMENTS

| | | | |
|---|---|---|---|
| 3,266,234 | A | 8/1966 | Cook |
| 4,561,253 | A | 12/1985 | Curtil |

(Continued)

FOREIGN PATENT DOCUMENTS

| | | |
|---|---|---|
| BR | 102023023482 A2 | 7/2024 |
| CN | 1079533 A | 12/1993 |

(Continued)

OTHER PUBLICATIONS

Utility U.S. Appl. No. 17/659,368, filed Apr. 15, 2022.

(Continued)

*Primary Examiner* — Kevin A Lathers
(74) *Attorney, Agent, or Firm* — KLINTWORTH & ROZENBLAT LLP (57) ABSTRACT

A power system for a work vehicle includes a compression ignition engine with piston-cylinder set that defines a compression ratio. The engine further includes a piston actuation arrangement coupled to the piston of the first piston-cylinder set and configured to be repositioned to dynamically modify the compression ratio of the first piston-cylinder set. The system includes a controller coupled to command the first piston actuation arrangement such that, in an auto-ignition assistance mode, the first piston actuation arrangement places the first piston into a first configuration resulting in a first compression ratio; and in a nominal mode, the first piston actuation arrangement places the first piston into a second configuration resulting a second compression ratio that is lower than the first compression ratio.

18 Claims, 5 Drawing Sheets

(56) References Cited

U.S. PATENT DOCUMENTS

| | | | |
|---|---|---|---|
| 5,203,830 A | 4/1993 | Faletti et al. | |
| 6,276,334 B1 | 8/2001 | Flynn et al. | |
| 6,321,699 B1* | 11/2001 | Britton | F01L 7/022 |
| | | | 123/80 BA |
| 6,601,563 B2 | 8/2003 | Funke et al. | |
| 7,004,125 B2 | 2/2006 | Asada | |
| 7,152,559 B2 | 12/2006 | Kuo et al. | |
| 7,228,839 B2 | 6/2007 | Kuo et al. | |
| 7,347,171 B2 | 3/2008 | Leman et al. | |
| 7,628,013 B2 | 12/2009 | Aikawa et al. | |
| 7,765,994 B2 | 8/2010 | Winstead | |
| 8,150,582 B2 | 4/2012 | Blommer et al. | |
| 8,406,956 B2 | 3/2013 | Wey et al. | |
| 8,474,258 B2 | 7/2013 | Mahakul et al. | |
| 8,522,756 B2 | 9/2013 | Vuk et al. | |
| 8,590,517 B2 | 11/2013 | Yokoo et al. | |
| 8,930,118 B2 | 1/2015 | Nagatsu et al. | |
| 9,316,180 B2 | 4/2016 | Heiermann | |
| 9,512,814 B2 | 12/2016 | Yamakawa et al. | |
| 9,835,065 B2 | 12/2017 | Jozsa et al. | |
| 9,845,109 B2 | 12/2017 | George et al. | |
| 9,903,262 B2 | 2/2018 | Edwards et al. | |
| 10,487,753 B2 | 11/2019 | Idicheria et al. | |
| 10,648,443 B1 | 5/2020 | Inoue et al. | |
| 10,704,436 B2 | 7/2020 | Jozsa et al. | |
| 10,801,430 B2 | 10/2020 | McCarthy, Jr. et al. | |
| 11,199,162 B2 | 12/2021 | McCarthy, Jr. et al. | |
| 11,305,813 B2 | 4/2022 | Kim | |
| 11,536,213 B2 | 12/2022 | Miles et al. | |
| 11,572,673 B2 | 2/2023 | Dou et al. | |
| 11,572,824 B2 | 2/2023 | Miles et al. | |
| 11,795,869 B1 | 10/2023 | Lohmann et al. | |
| 12,024,247 B2 | 7/2024 | Schäfer et al. | |
| 2003/0200942 A1* | 10/2003 | Dachtchenko | F02D 15/02 |
| | | | 123/78 E |
| 2004/0045283 A1 | 3/2004 | Asada | |
| 2005/0252464 A1 | 11/2005 | Aikawa et al. | |
| 2006/0016417 A1 | 1/2006 | Kuo et al. | |
| 2006/0016420 A1 | 1/2006 | Kuo et al. | |
| 2006/0086560 A1 | 4/2006 | Furusho et al. | |
| 2007/0119422 A1 | 5/2007 | Lewis et al. | |
| 2007/0204747 A1* | 9/2007 | Aoyama | F16J 1/006 |
| | | | 92/212 |
| 2007/0295290 A1* | 12/2007 | Cao | F02D 13/0269 |
| | | | 123/64 |
| 2007/0295316 A1 | 12/2007 | Davis et al. | |
| 2008/0288157 A1 | 11/2008 | Winsor et al. | |
| 2010/0211264 A1 | 8/2010 | Wey et al. | |
| 2010/0268422 A1 | 10/2010 | Blommer et al. | |
| 2011/0247584 A1 | 10/2011 | Gentile | |
| 2011/0315128 A1 | 12/2011 | Yokoo et al. | |
| 2013/0019828 A1 | 1/2013 | Nagatsu et al. | |
| 2013/0047958 A1 | 2/2013 | Yamakawa et al. | |
| 2013/0180485 A1* | 7/2013 | Kamio | F01L 1/3442 |
| | | | 123/90.17 |
| 2015/0040560 A1 | 2/2015 | Jozsa et al. | |
| 2015/0300284 A1 | 10/2015 | Ishida et al. | |
| 2015/0330315 A1* | 11/2015 | Takahashi | F02D 15/02 |
| | | | 123/48 A |
| 2015/0354437 A1 | 12/2015 | Mulye | |
| 2016/0010576 A1 | 1/2016 | Primus et al. | |
| 2016/0280251 A1 | 9/2016 | George et al. | |
| 2017/0101941 A1* | 4/2017 | Gladel | F02D 15/00 |
| 2018/0009443 A1 | 1/2018 | Norstad | |
| 2018/0058285 A1 | 3/2018 | Jozsa et al. | |
| 2018/0106204 A1 | 4/2018 | McCarthy, Jr. et al. | |
| 2018/0306098 A1 | 10/2018 | Edwards et al. | |
| 2018/0347476 A1 | 12/2018 | Idicheria et al. | |
| 2019/0040826 A1 | 2/2019 | McCarthy, Jr. et al. | |
| 2019/0048812 A1 | 2/2019 | Lundgren | |
| 2019/0389509 A1 | 12/2019 | Kim | |
| 2020/0088081 A1 | 3/2020 | Rohde et al. | |
| 2021/0054777 A1 | 2/2021 | Blumreiter et al. | |
| 2021/0179168 A1 | 6/2021 | Zeiler | |
| 2022/0003184 A1 | 1/2022 | Blumreiter et al. | |
| 2022/0003318 A1 | 1/2022 | Brushkivskyy et al. | |
| 2022/0018297 A1 | 1/2022 | Blumreiter et al. | |
| 2022/0034284 A1 | 2/2022 | Klingbeil | |
| 2022/0048563 A1 | 2/2022 | Schäfer | |
| 2023/0160350 A1 | 5/2023 | Klingbeil | |
| 2024/0067261 A1 | 2/2024 | Kim | |
| 2024/0140525 A1 | 5/2024 | Maruyama et al. | |
| 2024/0141844 A1 | 5/2024 | Lohmann | |

FOREIGN PATENT DOCUMENTS

| | | |
|---|---|---|
| CN | 101023250 A | 8/2007 |
| CN | 101198771 A | 6/2008 |
| CN | 101495729 A | 7/2009 |
| CN | 100567714 C | 12/2009 |
| CN | 101198771 B | 6/2010 |
| CN | 101900637 A | 12/2010 |
| CN | 102312731 A | 1/2012 |
| CN | 101363378 B | 7/2012 |
| CN | 102884300 A | 1/2013 |
| CN | 103026032 A | 4/2013 |
| CN | 102884300 B | 7/2015 |
| CN | 103026032 B | 8/2015 |
| CN | 105408607 A | 3/2016 |
| CN | 105683535 A1 | 6/2016 |
| CN | 106004994 A | 10/2016 |
| CN | 106321269 A | 1/2017 |
| CN | 106004994 B | 7/2018 |
| CN | 108778900 A | 11/2018 |
| CN | 107499373 B | 3/2020 |
| CN | 111365133 A | 7/2020 |
| CN | 112368470 A | 2/2021 |
| CN | 108291494 B | 3/2021 |
| CN | 108474308 B | 11/2021 |
| CN | 112368470 B | 3/2023 |
| CN | 116811995 A | 9/2023 |
| CN | 119226660 A | 12/2024 |
| DE | 112008001007 T5 | 2/2010 |
| DE | 112008001087 T5 | 7/2010 |
| DE | 102011105530 A1 | 3/2012 |
| DE | 102010064182 A1 | 6/2012 |
| DE | 102011015696 A1 | 10/2012 |
| DE | 112011101517 T5 | 5/2013 |
| DE | 102011105530 B4 | 11/2015 |
| DE | 102016203027 A1 | 2/2016 |
| DE | 112008001087 B4 | 6/2016 |
| DE | 102015206837 A1 | 10/2016 |
| DE | 102015221809 A1 | 4/2017 |
| DE | 112015007102 T5 | 8/2018 |
| DE | 102016105498 B4 | 6/2020 |
| DE | 112011101517 B4 | 4/2021 |
| DE | 102020119860 A1 | 2/2022 |
| DE | 102021208165 A1 | 2/2022 |
| DE | 112015007102 B4 | 7/2022 |
| DE | 102021208165 B4 | 5/2024 |
| DE | 102023128286 A1 | 5/2024 |
| EP | 2564047 B1 | 3/2016 |
| FR | 2918704 A3 | 1/2009 |
| FR | 2944056 A1 | 10/2010 |
| JP | 2006161799 A | 6/2006 |
| JP | 2008025534 A | 2/2008 |
| JP | 2008223537 A | 9/2008 |
| JP | 2011214477 A | 10/2011 |
| JP | 5299586 B2 | 9/2013 |
| JP | 5569100 B2 | 8/2014 |
| JP | 5902289 B2 | 4/2016 |
| JP | 2017078337 A | 4/2017 |
| JP | 6634774 B2 | 1/2020 |
| KR | 20180041195 A | 4/2018 |
| KR | 102354453 B1 | 1/2022 |
| WO | WO9324749 A1 | 12/1993 |
| WO | WO2006022998 A2 | 3/2006 |
| WO | WO2006023040 A1 | 3/2006 |
| WO | WO2009024170 A1 | 2/2009 |
| WO | WO2011122014 A1 | 10/2011 |
| WO | WO2011135859 A1 | 11/2011 |
| WO | WO 2016020160 A1 | 2/2016 |
| WO | WO2017095411 A1 | 6/2017 |

(56) References Cited

FOREIGN PATENT DOCUMENTS

| | | |
|---|---|---|
| WO | WO2017127585 A1 | 7/2017 |
| WO | WO2018221511 A1 | 12/2018 |
| WO | WO2020007456 A1 | 1/2020 |
| WO | 2020232287 A1 | 11/2020 |
| WO | 2021174016 A1 | 9/2021 |
| WO | 2022011275 A1 | 1/2022 |

OTHER PUBLICATIONS

USPTO Final Office Action issued in Utility U.S. Appl. No. 18/177,514 dated Dec. 1, 2023.

USPTO Non-Final Office Action issued in Utility U.S. Appl. No. 17/977,016 dated Feb. 16, 2024.

USPTO Non-Final Office Action issued in Utility U.S. Appl. No. 18/145,536 dated Dec. 19, 2023.

USPTO Non-Final Office Action issued in Utility U.S. Appl. No. 18/462,313 dated Feb. 28, 2024.

AVL—IWIS—Dual Mode VCS TM at httpswww.youtube.comwatchv=cAlb7wJ0Uk8, dated Sep. 11, 2017. (1 page).

ClearFlame—ClearFlame Engine Technologies Overview at httpswww.youtube, dated May 18, 2020. (1 page).

ClearFlame—SAE Chicago Presents: ClearFlame Engine Technologies at httpswww.youtube.comwatchv=fAIMtoIU2B8, dated Mar. 2021. (1 page).

FEV—VCR Conrod Coupled Simulation at httpswww.youtube.comwatchv=30sEeZ54X_s, dated May 23, 2017. (1 Page).

FEV—Explore FEV's VCR Conrod at httpswww.youtube.comwatchv=ABNZY3Enykg, dated Apr. 24, 2015. (1 page).

Wikipedia—Glow plug (diesel engine) at https://en.wikipedia.org/wiki/Glow_plug_diesel_engine), undated, admitted prior art. (2 pages).

Nissan—Nissan VC Turbo Engine (Variable Compression Turbo) at https://www.youtube.com/watch?v=YPDXgAWhrs4, dated Mar. 30, 2018. (4 pages).

Utility U.S. Appl. No. 17/975,399, filed Oct. 27, 2022.

Utility U.S. Appl. No. 17/977,016, filed Oct. 31, 2022.

Non-Final Office Action issued in Utility U.S. Appl. No. 18/177,514 dated Jun. 27, 2023 (58 pages).

U.S. Department of Energy: Energy Efficiency & Renewable Energy (EERE), Alternative Fuels Data Center, Flexible Fuel Vehicles, https://afdc.energy.gov/vehicles/flexible-fuel, Apr. 7, 2024.

John Deere: "Future Farming, John Deere presents ethanol engine at Agritechnica", https://www.futurefarming.com/tech-in-focus/john-deere-presents-ethanol-engine-at-agritechnica/, Oct. 30, 2023.

Ethanol Producer Magazine: "Vale, Komatsu and Cummins announce collaboration to develop Dual Fuel large trucks, powered by ethanol and diesel", https://ethanolproducer.com/articles/vale-komatsu-and-cummins-announce-collaboration-to-develop-dual-fuel-large-trucks-powered-by-ethanol-and-diesel/, Jul. 16, 2024 by Vale.

MAN Energy Solutions: "Methanol-ready four-stroke engines", https://www.man-es.com/marine/products/four-stroke-engines/methanol-ready-engines/, Dec. 10, 2023.

ClearFlame Engine Technologies: Diesel Engine Aftertreatment, "Our Technology, Reduce emissions and lower your cost of ownership with ClearFlame's clean engine technology", https://clearflame.com/technology/, Sep. 26, 2022.

SAE International: Heavy-Duty Diesel Sustainable Transport Symposium, Application of Westport Fuel Systems' HPDI Technology to a Demonstration Truck, Gothenburg, Sweden, (Westport Fuel Systems), https://www.sae.org/attend/heavy-duty-sustainable-transport-symposium, May 3-4, 2023.

Cummins Inc.: "Dual Fuel Engines for Drilling" (Natural Gas), https://www.cummins.com/engines/drilling/dual-fuel-engines-drilling, Sep. 18, 2018.

U.S. Department of Energy: Curan, Scott et al., Oak Ridge National Laboratory (ORNL), "Ammonia for 4-stroke Marine Dual Fuel and Gas Engines (Retrofits and New)", DOE Vehicle Technologies Office Annual Merit Review, Project ID: DORMA046, Jun. 2024.

SAE International WCX 2024, (Miles, Paul): Year-in-Review on Emissions, Fuels, and Propulsion Engines for Heavy-Duty and Off-Road Applications, Sandia National Laboratories Combustion Research Facility, Livermore, CA, SAE WCX Apr. 16-18, 2024.

Non-Final Office Action issued in U.S. Appl. No. 18/796,035 dated Jan. 29, 2025.

\* cited by examiner

WORK VEHICLE POWER SYSTEM WITH DYNAMIC AUTO-IGNITION ASSISTANCE COMPRESSION RATIOS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to work vehicle power systems and methods.

BACKGROUND OF THE DISCLOSURE

Heavy work vehicles, such as used in the construction, agriculture, and forestry industries, typically include a power system with an internal combustion engine. For many work vehicles, the power system includes a diesel engine that may have higher lugging, pull-down, and torque characteristics for associated work operations. However, diesel and other types of fossil fuel-based engines may generate undesirable emissions.

Ethanol, derived from renewable resources such as corn or sugar cane, has been used as a fuel source to reduce greenhouse gas emissions. Typically, within the general consumer automotive markets, ethanol is blended into gasoline and used by spark ignited engines. However, this type of use and such engines are generally not suitable for use in heavy work applications.

SUMMARY OF THE DISCLOSURE

The disclosure provides a work vehicle low cetane, compression ignition power system with variable compression ratios to facilitate ignition and support operation in a range of conditions.

In one aspect, the disclosure provides a power system for a work vehicle. The power system includes an intake arrangement configured to intake charge air; and a compression ignition engine. The compression ignition engine includes a plurality of piston-cylinder sets configured to receive, ignite, and combust intake gas that includes the charge air from the intake arrangement to generate mechanical power and exhaust gas. At least a first piston-cylinder set of the piston cylinder sets includes: a cylinder defining an intake port and an exhaust port; a piston positioned at least partially within the cylinder to from a combustion chamber in between that defines a compression ratio, the combustion chamber being in fluid communication with the intake port and the exhaust port; an intake valve configured to open and close the intake port; an exhaust valve configured to open and close the exhaust port; and a fuel injector configured to inject fuel into the combustion chamber. The compression ignition engine further includes a plurality of piston actuation arrangements, including a first piston actuation arrangement coupled to the piston of the first piston-cylinder set and configured to be repositioned to dynamically modify the compression ratio of the first piston-cylinder set. The system further includes a controller coupled to command the first piston actuation arrangement such that, in an auto-ignition assistance mode, the first piston actuation arrangement places the first piston into a first configuration resulting in a first compression ratio; and in a nominal mode, the first piston actuation arrangement places the first piston into a second configuration resulting a second compression ratio that is lower than the first compression ratio.

In a further example of the power system, the compression ignition engine is configured to operate with a low cetane fuel.

In a further example of the power system, the compression ignition engine is configured to operate with a low cetane fuel having a cetane value of less than 40.

In a further example of the power system, the first compression ratio of the first piston-cylinder set in the auto-ignition assistance mode is sufficient to auto-ignite the low cetane fuel.

In a further example of the power system, the first compression ratio of the first piston-cylinder set in the auto-ignition assistance mode is sufficient to result in a temperature within the combustion chamber of at least 800° C. independent of operating conditions.

In a further example of the power system, the controller is configured to command the first piston actuation arrangement to adjust the first piston-cylinder set between the first compression ratio and the second compression ratio based on ambient temperature.

In a further example of the power system, the controller is configured to command the first piston actuation arrangement to adjust the first piston-cylinder set between the first compression ratio and the second compression ratio based on exhaust temperature sensor signals.

In a further example of the power system, the controller is configured to command the first piston actuation arrangement to adjust the first piston-cylinder set between the first compression ratio and the second compression ratio based on intake temperature.

In a further example of the power system, the controller is configured to command the first piston actuation arrangement to adjust the first piston-cylinder set between the first compression ratio and the second compression ratio based on engine load.

In a further example of the power system, the controller is configured to command the first piston actuation arrangement to place or maintain the first piston-cylinder set at the first compression ratio during start-up in the auto-ignition assistance mode In a further aspect, the disclosure provides a work vehicle with a chassis; a drive assembly supported on the chassis; and a power system supported on the chassis and configured to power the drive assembly. The power system includes an intake arrangement configured to intake charge air; and a compression ignition engine. The compression ignition engine includes a plurality of piston-cylinder sets configured to receive, ignite, and combust intake gas that includes the charge air from the intake arrangement to generate mechanical power and exhaust gas. At least a first piston-cylinder set of the piston-cylinder sets includes: a cylinder defining an intake port and an exhaust port; a piston positioned at least partially within the cylinder to from a combustion chamber in between that defines a compression ratio, the combustion chamber being in fluid communication with the intake port and the exhaust port; an intake valve configured to open and close the intake port; an exhaust valve configured to open and close the exhaust port; and a fuel injector configured to inject fuel into the combustion chamber. The compression ignition engine further includes a plurality of piston actuation arrangements, including a first piston actuation arrangement coupled to the piston of the first piston-cylinder set and configured to be repositioned to dynamically modify the compression ratio of the first piston-cylinder set. The system further includes a controller coupled to command the first piston actuation arrangement such that, in an auto-ignition assistance mode, the first piston actuation arrangement places the first piston into a first configuration resulting in a first compression ratio; and in a nominal mode, the first piston actuation arrangement places the first piston into a second configuration resulting a second compression ratio that is lower than the first compression ratio.

In a further example of the work vehicle, the compression ignition engine is configured to operate with a low cetane fuel.

In a further example of the work vehicle, the compression ignition engine is configured to operate with fuel having a cetane value of less than 40.

In a further example of the work vehicle, the first compression ratio of the first piston-cylinder set in the auto-ignition assistance mode is sufficient to auto-ignite the low cetane fuel.

In a further example of the work vehicle, the first compression ratio of the first piston-cylinder set in the auto-ignition assistance mode is sufficient to result in a temperature within the combustion chamber of at least 800° C. independent of operating conditions.

In a further example of the work vehicle, the controller is configured to command the first piston actuation arrangement to adjust the first piston-cylinder set between the first compression ratio and the second compression ratio based on ambient temperature.

In a further example of the work vehicle, the controller is configured to command the first piston actuation arrangement to adjust the first piston-cylinder set between the first compression ratio and the second compression ratio based on exhaust temperature sensor signals.

In a further example of the work vehicle, the controller is configured to command the first piston actuation arrangement to adjust the first piston-cylinder set between the first compression ratio and the second compression ratio based on intake temperature.

In a further example of the work vehicle, the controller is configured to command the first piston actuation arrangement to adjust the first piston-cylinder set between the first compression ratio and the second compression ratio based on engine load.

In a further example of the work vehicle, the controller is configured to command the first piston actuation arrangement to place or maintain the first piston-cylinder set at the first compression ratio during start-up in the auto-ignition assistance mode.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed power system and method, as shown in the accompanying figures of the drawings described briefly above. Various modifications to the example embodiments may be contemplated by one of skill in the art. Discussion herein may sometimes focus on the example application of power system in a tractor, but the disclosed power system is applicable to other types of work vehicles and/or other types of engine systems.

Work vehicles may include power systems that typically have diesel engines to produce torque in a wide range of applications, such as long-haul trucks, tractors, agricultural or construction vehicles, surface mining equipment, non-electric locomotives, stationary power generators and the like. Even though such engines may have advantageous energy and performance characteristics, diesel and other types of fossil fuel-based engines may generate undesirable emissions. In contrast, ethanol, derived from renewable resources such as corn or sugar cane, has been used as a fuel source to reduce greenhouse gas emissions. Typically, within the general consumer automotive markets, ethanol is blended into gasoline and used by spark ignited engines. However, this type of use and such engines are typically not suitable for use in heavy work applications.

Generally, certain non-diesel fuels that have desirable renewable sourcing, performance, and/or emission characteristics may have relatively low cetane numbers. A cetane number (or cetane value) is an indicator of the combustion speed of fuel and compression needed for ignition. The scale for measuring cetane numbers ranges from 0 to 100 with higher numbers indicating quicker ignition periods, thereby indicating lower temperatures and pressures required for combustion. In compression combustion engines (e.g., in diesel-type engines), ethanol is generally not used due to its relatively low cetane number (e.g., less than 5) that requires high temperatures for ignition. In other words, compression ignition engines that rely upon ethanol may encounter challenges in cold start and low load conditions in which the temperature is insufficient for reliable ignition. As examples, diesel fuel will reliably auto-ignite inside an engine cylinder at a temperature of about 500 to 600° C., while a fuel such as ethanol requires a temperature of about 850° C. in the cylinder to reliably auto-ignite.

According to examples discussed herein, a power system may include an engine that primarily operates on a low cetane fuel, such as ethanol and other alcohol-based fuels (e.g., methanol, propanol, etc.). Such power systems may include piston-cylinder sets that interact with piston actuation arrangements configured to modify the compression ratio during certain conditions in order to achieve the desired temperatures required for a compression ignition engine to auto-ignite low cetane fuels. Such an arrangement and operation enable the use of a low cetane fuel with acceptable ignition and combustion performance in a diesel-type engine. The implementation of low cetane fuels may be facilitated by other aspects of the power system, as discussed in greater detail below.

The compression ratio (CR) of an internal combustion engine is defined as the ratio of the cylinder volume when the piston is at bottom dead center (BDC) to the cylinder volume when the piston is at top dead center (TDC). As described below, the compression ratio may be adjusted based on operating conditions, particularly with consideration of the relatively high auto-ignition temperatures required for low cetane fuels. For example, at low loads and low ambient temperatures, and/or during start-up, the compression ratio may be increased to a value sufficient to auto-ignite the low cetane fuel; and during nominal conditions (e.g., after operating for a period of time and/or at higher load), the compression ratio may be decreased in order to improve power and/or certain efficiencies.

Generally, as used herein, the term "low cetane fuel" may refer to a fuel with a cetane number (or value) less than that of diesel. For example, a low cetane fuel may have a cetane number of less than 40. One such example is ethanol with a cetane number of approximately 5.

Figure 1:
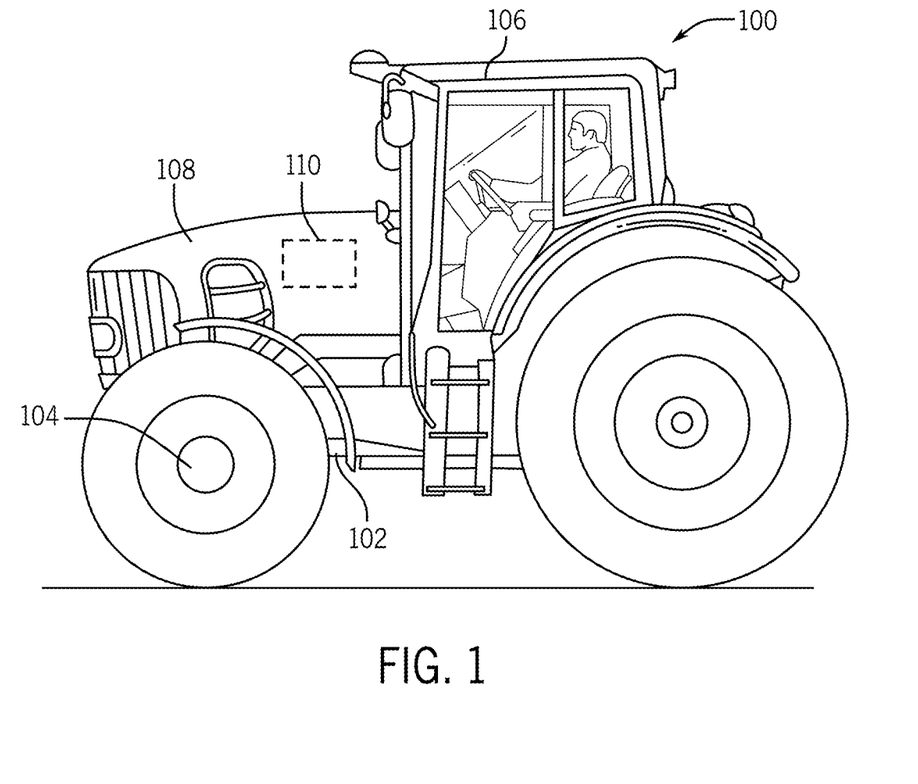
FIG. 1 is a simplified side view of an example work vehicle in the form of a tractor in which a power system may be used in accordance with an embodiment of this disclosure.

Referring to FIG. 1, in some embodiments, the disclosed power systems and methods with variable compression ratios enable the use of low cetane fuels in a compression ignition engine. In the depicted example, such power systems and methods are implemented with a work vehicle 100 embodied as a tractor that uses low cetane fuels. In other examples, the disclosed system and method may be implemented in other types of vehicles or machines, including stationary power systems and vehicles in the agricultural, forestry, and/or construction industries.

As shown, the work vehicle 100 may be considered to include a main frame or chassis 102, a drive assembly 104, an operator platform or cabin 106, a power system 108, and a controller 110. As is typical, the power system 108 includes an internal combustion engine used for propulsion of the work vehicle 100, as controlled and commanded by the controller 110 and implemented with the drive assembly 104 mounted on the chassis 102 based on commands from an operator in the cabin 106 and/or as automated within the controller 110.

As described below, the power system 108 may include a number of systems and components to facilitate various aspects of operation. As noted, the engine of the power system 108 may be a compression ignition engine for combustion that may result in improvements in emissions, performance, efficiency, and capability. Moreover, the engine may utilize a low cetane fuel, as introduced above and discussed in greater detail below. Otherwise, the power system 108 may include an air intake arrangement to direct air into the engine and a fuel arrangement to direct fuel (or fuels) into the engine for mixing with the air for combustion, as well as optional additional systems, such as turbocharger and/or exhaust recirculation (EGR) arrangements. Although not shown or described in detail herein, the work vehicle 100 may include any number of additional or alternative systems, subsystems, and elements. Further details of the power system 108 are provided below.

As noted, the work vehicle 100 includes the controller 110 (or multiple controllers) to control one or more aspects of the operation, and in some embodiments, facilitate implementation of the power system 108, including various components and control elements associated with the use of low cetane fuels (e.g., ethanol). The controller 110 may be considered a vehicle controller and/or a power system controller or sub-controller. In one example, the controller 110 may be implemented with processing architecture such as a processor and memory. For example, the processor may implement the functions described herein based on programs, instructions, and data stored in memory.

As such, the controller 110 may be configured as one or more computing devices with associated processor devices and memory architectures, as a hard-wired computing circuit (or circuits), as a programmable circuit, as a hydraulic, electrical or electro-hydraulic controller, or otherwise. The controller 110 may be configured to execute various computational and control functionality with respect to the work vehicle 100 (or other machinery). In some embodiments, the controller 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 110 may be in electronic, hydraulic, mechanical, or other communication with various other systems or devices of the work vehicle 100 (or other machinery). For example, the controller 110 may be in electronic or hydraulic communication with various actuators, sensors, and other devices within (or outside of) the work vehicle 100, including any devices described below. In some embodiments, the controller 110 may be configured to receive input commands from, and to interface with, an operator via a human-vehicle operator interface that enables interaction and communication between the operator, the work vehicle 100, and the power system 108.

In some examples, the work vehicle 100 may further include various sensors that function to collect information about the work vehicle 100 and/or surrounding environment. Such information may be provided to the controller 110 for evaluation and/or consideration for operating the power system 108. As examples, the sensors may include operational sensors associated with the vehicle systems and components discussed herein, including engine and transmission sensors; fuel and/or air sensors; temperature, flow, and/or pressure sensors; and battery and power sensors, some of which are discussed below. Such sensor and operator inputs may be used by the controller 110 to determine an operating condition (e.g., a load, demand, or performance requirement), and in response, generate appropriate commands for the various components of the power system 108 discussed below, particularly the control the compression ratio within the engine, as discussed below. Although not shown or described in detail herein, the work vehicle 100 may include any number of additional or alternative systems, subsystems, and elements.

Additional information regarding the power system 108, particularly the components associated with fuel and gas flows are provided below. As introduced above and as will now be described in greater detail with reference to FIGS. 2, 3A, and 3B, the power system 108 uses a piston actuation arrangement in order to selectively modify the compression ratios of one or more piston-cylinder sets to result in combustion chamber temperatures sufficient to auto-ignite and maintain combustion of low cetane fuels, particularly at low ambient temperature or low load conditions.

Figure 2:
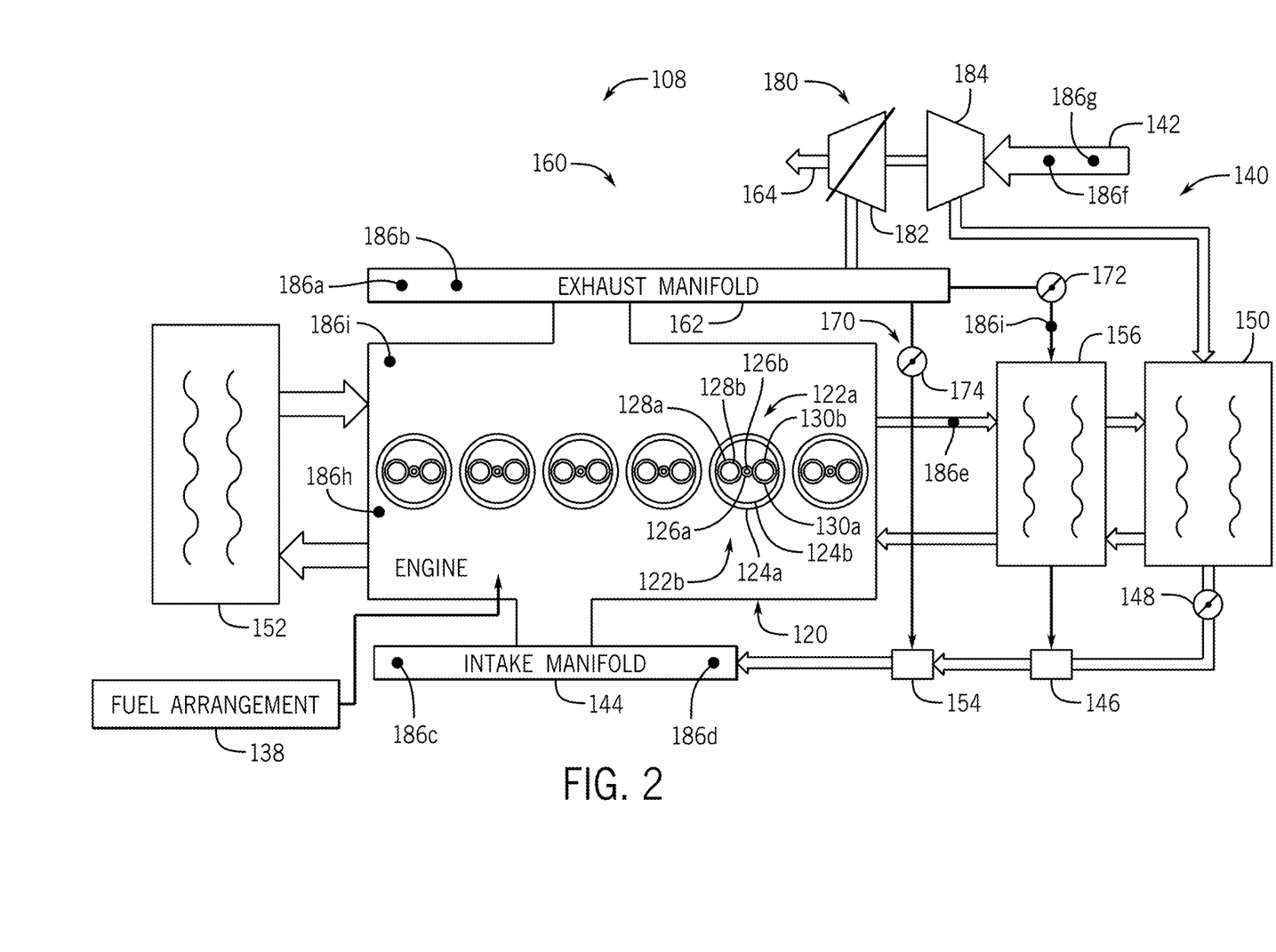
FIG. 2 is a simplified schematic diagram of a power system in accordance with an example embodiment.

Reference is initially made to FIG. 2, which is a schematic illustration of the power system 108 for providing power to the work vehicle 100 of FIG. 1, although the characteristics described herein may be applicable to a variety of machines. The configuration of FIG. 2 is just one example of the power system 108 and example embodiments according to the disclosure herein may be provided in other configurations.

As introduced above, the power system 108 includes an engine 120 configured to combust a mixture of fuel from a fuel arrangement 138 and air from an air intake arrangement 140 to generate power for propulsion and various other systems, thereby generating an exhaust gas that is accommodated by an exhaust arrangement 160. As also introduced above, various aspects of the power system 108 may be operated by the controller 110 (FIG. 1) based on operator commands and/or operating conditions. In some examples, the controller 110 may be a dedicated power system controller or a vehicle controller.

As noted, the engine 120 is primarily an engine that utilizes low cetane fuels, such as ethanol. Aside from the distinctions discussed herein, such an engine 120 may be similar to a diesel engine (i.e., compression ignition and combustion) in configuration and arrangement. The engine 120 may have any number or configuration of piston-cylinder sets 122a within an engine block 122b. In the illustrated implementation, the engine 120 is an inline-6 (I-6) engine defining six piston-cylinder sets 122a. Additional details about the piston-cylinder sets 122a and a piston actuation arrangement for modifying the compression ratios of the piston-cylinder sets 122a are provided below. In addition to those discussed below, the engine 120 may include any suitable features, such as cooling systems, peripheries, drivetrain components, sensors, etc.

As noted above, the engine 120 is selectively provided fuel for combustion by the fuel arrangement 138, particularly a low cetane fuel, such as ethanol. Generally, the fuel arrangement 138 may include any suitable components to facilitate operation (e.g., pumping, flow control, storage, injection, and the like) of the engine 120 and overall power system 108.

As also noted above, the engine 120 is selectively provided air for combustion by the air intake arrangement 140. The air intake arrangement 140, in this example, includes an intake conduit 142 and an air intake manifold 144. The air intake arrangement 140 directs fresh or ambient air through the air intake conduit 142; and the air intake manifold 144 directs at least a portion of that air into the air intake manifold 144 for introduction into the piston-cylinder sets 122a of the engine block 122b to be ignited with the fuel (e.g., ethanol) such that the resulting combustion products drive the mechanical output of the engine 120. Additional details about the air intake arrangement 140 will be provided below.

In one example and as schematically represented in FIG. 2, each of the piston-cylinder sets 122a includes a piston 124b arranged within the cylinder 124a to create a combustion chamber in between such that movement of the piston 124b within the cylinder 124a functions to facilitate the flow of gas into and out of the combustion chamber; to compress the gas within the combustion chamber to enable ignition and combustion; and to be driven by the combustion products to transfer the resulting mechanical power from the combustion process to a prime mover of the engine 120. Additionally, a fuel injector 126b is arranged to introduce an amount of fuel into the combustion chamber via a fuel port 126a. Moreover, an intake valve 130b is arranged to open and close an intake port 130a to admit intake gas from an intake conduit into the combustion chamber; and an exhaust valve 128b is arranged to open and close an exhaust port 128a to enable gas to flow out of the combustion chamber into an exhaust conduit.

The exhaust gas produced from the combustion process of the engine 120 may be received by the exhaust arrangement 160, which includes an exhaust manifold 162 to receive and distribute the exhaust from the piston-cylinder sets. At least a portion of the exhaust gas is directed from the exhaust manifold 162 into an exhaust conduit 164 out of the work vehicle 100, as described in greater detail below. Although not shown in detail, the exhaust gas may flow through one or more exhaust treatment components arranged proximate to the exhaust conduit 164. Such exhaust treatment components may function to treat the exhaust gas passing therethrough to reduce undesirable emissions and may include components such as a diesel oxidation catalyst (DOC), a diesel particulate filter (DPF), a selective catalytic reduction (SCR) system, and the like.

In this example, the power system 108 may include an exhaust gas recirculation (EGR) arrangement 170 and a turbocharger 180, each of which may have at least portions that may also be considered part of (or otherwise cooperate with) the air intake arrangement 140 and/or the exhaust arrangement 160. In other examples, the EGR arrangement 170 and/or the turbocharger 180 may be omitted.

Generally, the EGR arrangement 170 is configured to direct at least a first portion of exhaust gas out of the engine 120 and then back to the air intake arrangement 140 of the engine 120 as EGR gas, i.e., such that a remaining, second portion of the exhaust gas is directed through the turbocharger 180 and out of the vehicle 100 (FIG. 1) via the exhaust conduit 164 as vehicle exhaust, as noted above. Generally, as discussed in greater detail below, the EGR gas may be mixed with charge air (e.g., recirculated back to intake) in order to reduce the formation of NOx during combustion that may otherwise occur. Any suitable amount of exhaust gas may be recirculated (e.g., 5%-50%).

The EGR arrangement 170 may include one or more EGR valves 172, 174 that operate to control the various flows of EGR gas and/or exhaust gas. In this example, the EGR arrangement 170 may have two "paths," e.g., a cooled path in which a first portion of EGR flow is directed through an EGR cooler 156 and a bypass path in which a second portion of EGR flow is directed around (and not through) the EGR cooler 156. Valves 172, 174 may be commanded (e.g., by controller 110 of FIG. 1) to control the amount of flow through and around the EGR cooler 156. The EGR cooler 156 may be any suitable device configured to lower the temperature of the recirculated gas. Generally, the EGR cooler 156 includes one or more recirculated gas passages and one or more coolant passages, arranged such that heat may be transferred from the recirculated gas to a cooperating fluid (e.g., air or liquid).

The turbocharger 180 generally functions to increase the amount of air subsequently directed into the engine 120 for improved engine efficiency and power input. In one example, the turbocharger 180 includes a turbine 182 that receives a portion (e.g., the second portion) of the exhaust gas, as introduced above. The turbocharger 180 further includes a compressor 184 that is driven by the turbine 182. The compressor 184 functions to compress the ambient or charge air that enters the air intake arrangement 140 via the intake conduit 142. Generally, the turbocharger 180 may be a variable-geometry turbocharger, a wastegate (WG) turbocharger, a fixed turbocharger, and/or any other suitable type of turbocharger.

Returning to the air intake arrangement 140, the compressed charge air from the turbocharger compressor 184 may be directed into a charge air cooler 150 to reduce the temperature of the compressed charge air. In this example, the charge air cooler 150 is configured to direct the charge air into proximity with coolant or air (e.g., any type of cooling fluid) such that the heat is transferred from the charge air to the cooling air. Other cooling or heat exchange mechanisms may be provided. Briefly, the power system 108 may additionally include a second heat exchanger (or radiator) to facilitate cooling of the engine 120 via circulation of the coolant over a cooling mechanism, such as air-cooled fins. The coolant of the radiator 152 may be on the same cooling circuit as the coolant of the charge air cooler 150, or the charge air cooler 150 and the radiator 152 may be on separate cooling circuits.

Downstream of the charge air cooler 150 and the EGR cooler 156, the cooled EGR gas (e.g., a first portion of the EGR gas) and the intake charge air are mixed within a first mixer 146. The relatively hot temperature of the first portion of EGR gas operates to increase the temperature of the charge air in the mixer 146. As shown, the amount of compressed charge air directed into through the charge air cooler 150 and to the first mixer 146 may be controlled by an air throttle valve 148; and the amount of cooled EGR gas directed to the first mixer 146 may be controlled by EGR valve 172. The mixture of charge air and EGR gas (or "first mixed gas") is directed into a second mixer 154.

In addition to the first mixed gas, the second mixer 154 selectively additionally receives a further portion (or second portion) of EGR gas. The amount of second portion of EGR gas directed to the second mixer 154 may be controlled by the second EGR valve 174, which in turn may be commanded by a controller (e.g., controller 110 of FIG. 1). Generally, the second portion of EGR gas has a greater temperature than the downstream first mixed gas. As such, the resulting second mixed gas (or intake gas) may have a greater temperature than the downstream first mixed gas and a lower temperature than the second portion of EGR gas. The second mixed gas (or intake gas) is directed to the intake manifold 144, which as noted above, distributes the intake gas to the piston-cylinder sets 122a of the engine 120 for mixture, ignition, and combustion with fuel from the fuel arrangement 138.

As introduced above, the controller 110 (FIG. 1) may control operation of the engine 120, including the fuel arrangement 138 and air intake arrangement 140, as well as various other cooperating systems and components. In particular, the controller 110 may selectively command a variation in the compression ratio of the piston-cylinder sets 122a to provide reliable ignition and combustion within the engine 120 under all appropriate conditions. Generally, the controller 110 (FIG. 1) may be in communication with the various valves 128b, 130b, 148, 172, 174, injectors 126b, engine 120, sensors 186a-186i, and other associated components (e.g., the piston actuation arrangements discussed below) to collect information about operation of the power system 108 and to implemented or command modification and/or maintenance of such operation.

Generally, any type of sensor may be provided to facilitate operation of the drive assembly 108, including the example sensors 186a-186i schematically depicted in FIG. 2. One or more of the sensors 186a-186i may be omitted and/or additional sensors may be provided. In one example, the sensors 186a-186i may include an exhaust manifold pressure sensor 186a and an exhaust manifold temperature sensor 186b positioned within or proximate to the exhaust manifold 162 to respectively measure or otherwise facilitate the determination of the pressure and temperature of the exhaust gas upon existing the piston-cylinder sets 122a. The sensors 186a-186i may further include an intake manifold pressure sensor 186c and an intake manifold temperature sensor 186d positioned within or proximate to the intake manifold 144 to respectively measure or otherwise facilitate the determination of the pressure and temperature of the intake gas prior to entry into the piston-cylinder sets 122a. The sensors 186a-186i may further include a coolant temperature sensor 186e positioned along the circuit of the engine coolant to measure or otherwise facilitate the determination of the temperature of the engine coolant. The sensors 186a-186i may further include an ambient pressure sensor 186f and an ambient temperature sensor 186g positioned in a suitable location (e.g., at the intake conduit 132b) to measure or otherwise facilitate the determination of the respectively ambient pressure and ambient temperature. Further, the sensors 186a-186i may include a representation of load input 186h configurated to provide, determine or otherwise derive the load demanded from the engine 120 (e.g., based on a combination of inputs and operational conditions). The sensors 186a-186i may additionally include an EGR sensor 186i that collects data associated with the EGR arrangement 170. For example, the EGR sensor 186i may be a valve position sensor for valve 172 and/or a flow sensor that collects information from which an EGR rate may be determined. As noted above, the sensors 186a-186i may provide inputs to the controller 110 in order to facilitate operation of the power system 108, particularly to vary the engine compression ratios.

The power system 108 depicted in FIG. 2 is merely one example of a power system that may utilize a mechanism to vary engine compression ratios in order to facilitate ignition and/or combustion, as discussed in greater detail below with reference to FIGS. 3A, 3B, and 4. Other configurations of power systems may be provided.

Figure 3A:
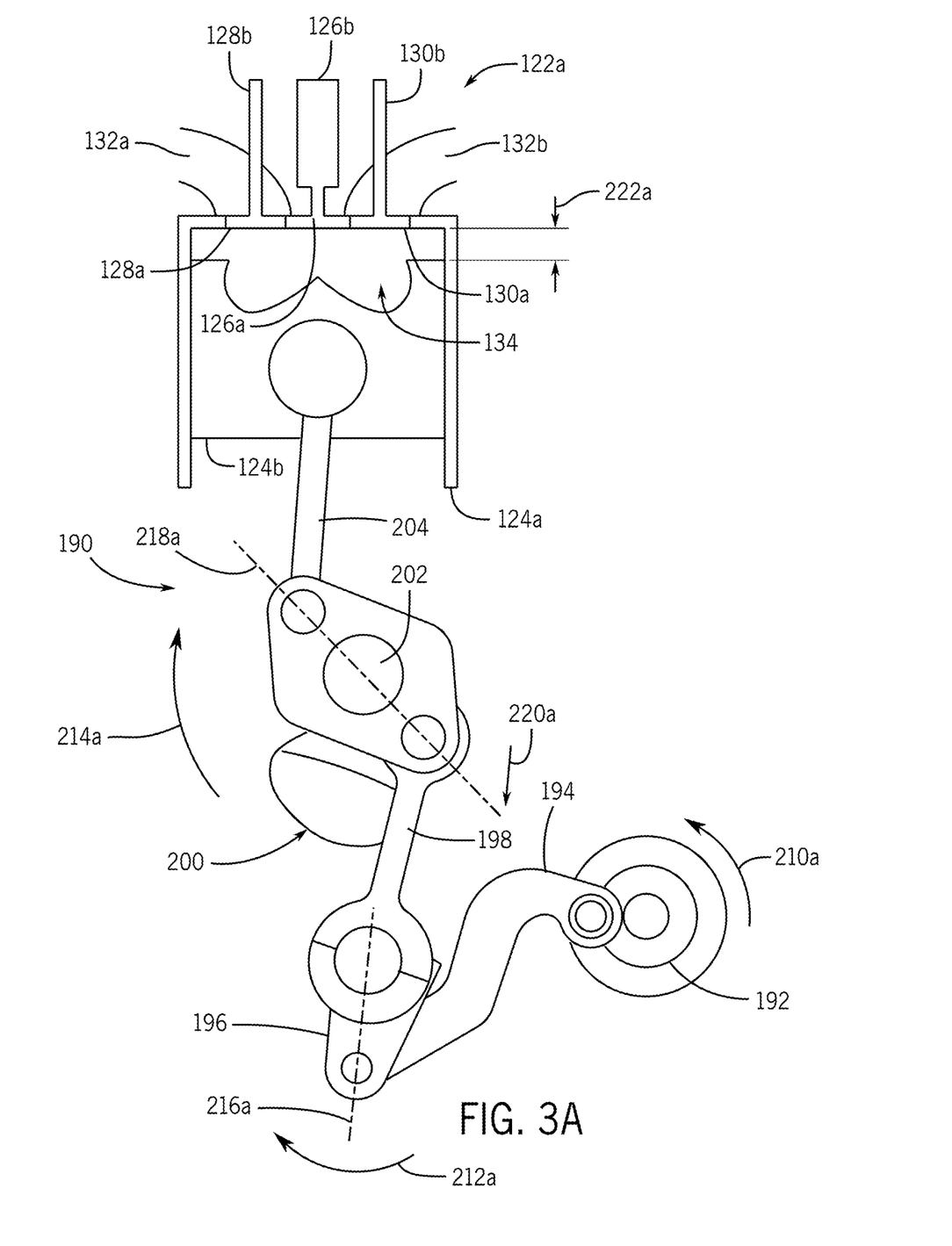
FIGS. 3A and 3B are schematic views of an example piston-cylinder set in a high compression ratio configuration position and in a low compression ratio configuration, respectively, in accordance with an example embodiment.
Figure 3B:
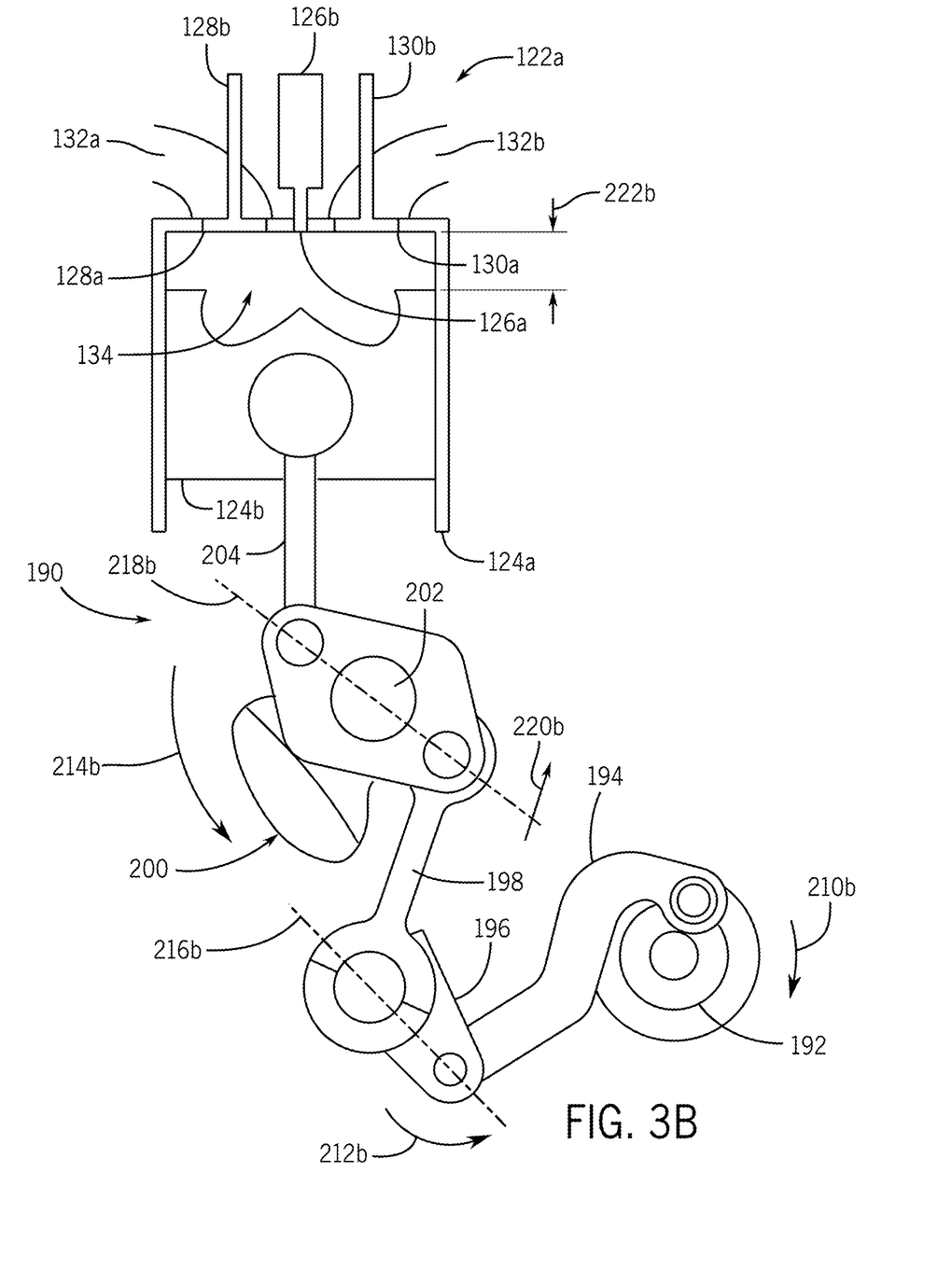

As examples, FIGS. 3A and 3B are simplified schematic diagrams of an example piston-cylinder set 122a and an example piston actuation arrangement 190 that may be implemented in the power system 108 of FIG. 2 in accordance with an example embodiment.

As introduced above, each of the piston-cylinder sets 122a includes a piston 124b arranged within the cylinder 124a to create a combustion chamber 134 in between such that movement of the piston 124b within the cylinder 124a functions to facilitate the flow of gas into and out of the combustion chamber 134; to compress the gas within the combustion chamber 134 to enable ignition and combustion; and to be driven by the combustion products to transfer the resulting mechanical power from the combustion process to a prime mover of the engine 120. Additionally, the fuel injector 126b is arranged to introduce an amount of fuel into the combustion chamber 134 via the fuel port 126a. Moreover, the intake valve 130b is arranged to open and close the intake port 130a to admit intake gas from an intake conduit 132b (e.g., coupled to intake manifold 144) into the combustion chamber 134; and the exhaust valve 128b is arranged to open and close the exhaust port 128a to enable gas to flow out of the combustion chamber 134 into an exhaust conduit 132a (e.g., coupled to exhaust manifold 162).

Briefly, collectively and individually, the piston-cylinder sets 122a undergo a four-stroke power cycle in one example embodiment. Generally, the power cycle includes an intake stroke, a compression stroke, a power stroke, and an exhaust stroke, which are constantly repeated during operation of the engine 120. During the intake stroke, the piston 124b moves from the top dead center (TDC) to the bottom dead center (BDC); and during this movement, at least the intake valve 130b is open while the piston 124b pulls air into the combustion chamber 134 by producing vacuum pressure into the cylinder 124a through the downward motion. During the compression stroke, the piston 124b moves from the bottom dead center (BDC) to the top dead center (TDC); and during this movement, both the intake and exhaust valves 130*b*, 128*b* are closed in this stroke, thereby resulting in adiabatic air compression to increase the pressure and temperature. At the end of this stroke, fuel is injected by the fuel injector 126*b* to be ignited and burned in the compressed hot gas. During the power stroke, the piston 124*b* is driven by the combustion of the fuel and gas mixture from the top dead center (TDC) to the bottom dead center (BDC); and during this movement, both the intake and exhaust valves 130*b*, 128*b* are closed. During the exhaust stroke, the piston 124*b* moves from the bottom dead center (BDC) to the top dead center (TDC); and during this movement, the exhaust valve 128*b* is open while the piston 124*b* forces exhaust gases out of the combustion chamber 134. At the end of this stroke, a crankshaft 202 (discussed below) coupled to the piston 124*b* has completed a second full 360° revolution.

As introduced above and as will now be discussed in greater detail, the piston actuation arrangement 190 is configured to modify the compression ratio based on one or more operational parameters. As noted, the compression ratio is the ratio of cylinder volume between bottom dead center (BDC) and top dead center (TDC), which is particularly of interest during the compression stroke that is intended to compress the air and fuel mixture sufficiently to auto-ignite the mixture to result in the power stroke. The views of FIGS. 3A and 3B depict the piston-cylinder set 122*a* at top dead center (TDC) of the piston stroke (e.g., just prior to ignition). The view of FIG. 3A particularly depicts the piston-cylinder set 122*a* and the piston actuation arrangement 190 in a high compression ratio configuration, and the view of FIG. 3B particularly depicts the piston-cylinder set 122*a* and the piston actuation arrangement 190 in a low compression ratio configuration. In addition to the high and low compression ratio configurations discussed as examples, in some examples, the piston actuation arrangement 190 may configure the piston-cylinder sets 122*a* to compression ratios in between the "high" and "low" compression ratios generally discussed herein. In some examples, the compression ratio configurations may be considered "continuous" in order to provide a particular advantageous ratio for each operational condition. In other examples, the compression ratio configurations may only have two or more settings in order to accommodate ranges of conditions. Typically, however, the term "auto-ignition assistance mode" may encompass or imply a spectrum of particular compression ratio configurations relative to that of the nominal mode.

As shown, in the example of FIGS. 3A and 3B, the piston actuation arrangement 190 includes an actuator drive 192, an actuator shaft 194, an actuator link 196, a control link 198, a multi-link apparatus 200, and a piston shaft 204 and further supports the crankshaft 202 that generally functions to transfer power between the piston 124*b* and other portions of the engine 120 (FIG. 2). Briefly, during the power cycle described above, the reciprocating motion of the piston 124*b* is accompanied by rotational motion of the crankshaft 202 (e.g., which is coupled to an output drive of the engine 120 (FIG. 2)). In other words, rotation of the crankshaft 202 forces the piston 124*b* from bottom dead center (BDC) to top dead center (TDC) during the compression stroke and the exhaust stroke and from top dead center (TDC) to bottom dead center (BDC) during the intake stroke; and the piston 124*b* being forced from top dead center (TDC) to bottom dead center (BDC) by the combustion products during the power stroke functions to drive the crankshaft 202.

Referring again to the piston actuation arrangement 190, generally, the actuator drive 192 may be a motor, or may be coupled to be driven by a motor, e.g., an electric or hydraulic motor, to be rotated or otherwise pivoted in first and second directions (e.g., clockwise or counterclockwise) based on commands from the controller 110 (FIG. 1). The actuator shaft 194 has a first end that is coupled to be driven upon pivoting or rotation by the actuator drive 192 and a second end that is coupled to an actuator link 196, which is additionally coupled to a first end of the control link 198. The second end of the control link 198 is coupled to a multi-link apparatus 200, which in turn, is coupled to the piston shaft 204. The piston shaft 204 extends between the piston 124*b* and the multi-link apparatus 200. As shown, the multi-link apparatus 200 supports the crankshaft 202.

As a result of the configuration of the piston actuation arrangement 190, pivoting the actuator drive 192 operates to modify the respective positions of the actuator drive 192, the actuator shaft 194, the actuator link 196, the control link 198, the multi-link apparatus 200, and the piston shaft 204 in order to selectively lengthen or shorten the stroke of the piston 124*b* relative to the cylinder 124*a*. As a result, the piston actuation arrangement 190 may modify operation of the piston cylinder set 122*a* to selectively provide variable compression ratios, including the example high compression ratio and the example low compression ratio described below, as well as intermediate ratios in between the high and low compression ratios.

With particular reference to FIG. 3A, the piston actuation arrangement 190 may be commanded such that the piston cylinder set 122*a* is positioned to result in a high compression ratio. In the view of FIG. 3A, the actuator drive 192 has been pivoted counterclockwise (e.g., relative to lower compression ratio positions), as indicated by arrow 210*a*, which pushes the actuator shaft 194 such that the actuator link 196 is pivoted in a generally clockwise direction, as indicated by arrow 212*a*. The pivoting of the actuator link 196 functions to pivot the end of the control link 198 attached to the actuator link 196 (e.g., as reflected by comparison of reference line 216*a* of FIG. 3A to reference line 216*b* of FIG. 3B), which pulls the other end of the control link 198, as reflected by arrow 220*a*. Pulling the control link 198 operates to pivot the multi-link apparatus 200 in a clockwise direction (in the example of FIG. 3A), as reflected by arrow 214*a* (and a comparison between reference line 218*a* in FIG. 3A and the reference line 218*b* in FIG. 3B). Pivoting the multi-link apparatus 200 in this manner functions to reposition the piston shaft 204 and the overall configuration of the piston actuation arrangement 190 to result in a relatively longer piston stroke to push the piston 124*b* further up into the cylinder 124*a* via the piston shaft 204, thereby resulting in a higher compression ratio.

In contrast, and with particular reference to FIG. 3B, the piston actuation arrangement 190 may be commanded such that the piston cylinder set 122*a* is positioned to result in a low compression ratio. In the view of FIG. 3A, the actuator drive 192 has been pivoted clockwise (e.g., relative to higher compression ratio positions), as indicated by arrow 210*b*, which pulls the actuator shaft 194 such that the actuator link 196 is pivoted in a generally counterclockwise direction, as indicated by arrow 212*b*. The pivoting of the actuator link 196 functions to pivot the end of the control link 198 attached to the actuator link 196 (e.g., as reflected by comparison of reference line 216*b* of FIG. 3B to reference line 216*a* of FIG. 3A), which pushes the other end of the control link 198, as reflected by arrow 220*b*. Pushing the control link 198 operates to pivot the multi-link apparatus 200 in a counterclockwise direction (in the example of FIG. 3B), as reflected by arrow 214b (and a comparison between reference line 218b in FIG. 3B and the reference line 218a in FIG. 3A). Pivoting the multi-link apparatus 200 in this manner functions to reposition the piston shaft 204 and the overall configuration of the piston actuation arrangement 190 to result in a relatively shorter piston stroke such that the piston 124b does not travel as far into the cylinder 124a, thereby resulting in a lower compression ratio.

Accordingly, modifying the piston stroke length with the piston actuation arrangement 190 varies the compression ratio of the engine. In the views of FIGS. 3A and 3B, the difference in compression ratio is depicted in the relatively smaller volume combustion chamber 134 of FIG. 3A as compared to that of FIG. 3B, as reflected by a comparison of distance 222a of FIG. 3A to distance 222b of FIG. 3B (e.g., each of which represent the distance between the top of the piston 124b and the underside of the top of the cylinder 124a, thereby providing an indication of the relative resulting compression ratios). In one example, the compression ratio may vary between 10:1 and 30:1.

The piston actuation arrangement 190 depicted in FIGS. 3A and 3B is merely one example of an arrangement that may be used to modify the compression ratio. Other examples include a "modifiable connecting rod" variable compression ratio design in which a connection rod between the piston and the crankshaft may be lengthened or shortened and a "dual actuator" variable compression ratio device in which dual actuators modify the effective length of the connection rod between the piston and the crankshaft.

Additional information regarding the modification of the compression ratios is discussed below with reference to the dataflow diagram of FIG. 4, which schematically depicts a piston actuation control system 230 embodied and/or implemented, in one example, by the controller 110, one or more sensors 186c-186i, and the piston actuation arrangement 190. Unless otherwise noted, the actuation control system 230 may be implemented with the features discussed above with reference to FIGS. 1, 2, 3A, and 3B, although in further examples, the actuation control system 230 may be implemented in other contexts.

Figure 4:
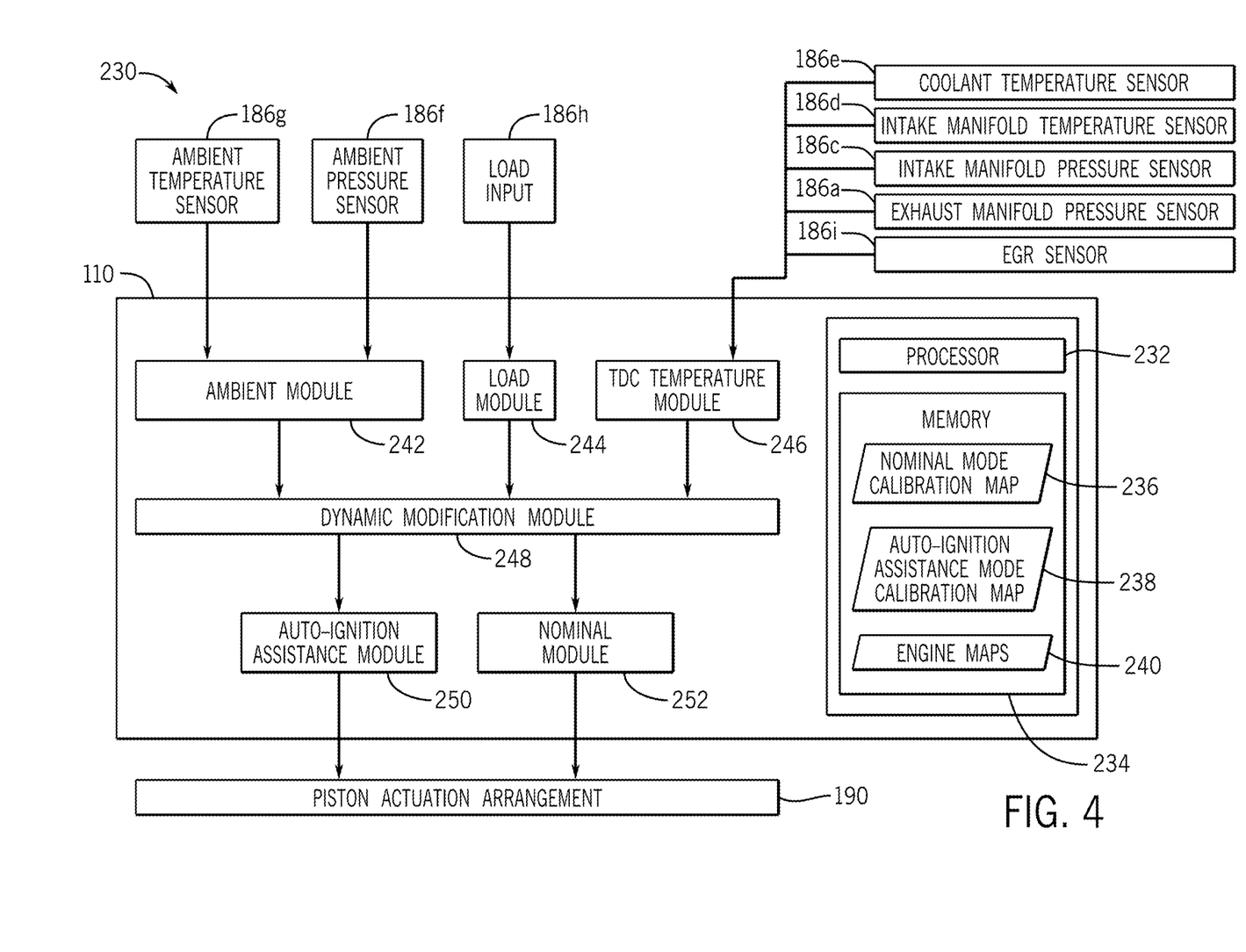
FIG. 4 is a block diagram of a piston actuation control system that may be incorporated into the power system of FIG. 2 in accordance with an example embodiment.

With respect to the piston actuation control system 230 of FIG. 4, the controller 110 may be organized as one or more functional units or modules 242, 244, 246, 248, 250, 252 (e.g., software, hardware, or combinations thereof). As can be appreciated, the modules 242, 244, 246, 248, 250, 252 shown in FIG. 4 may be combined and/or further partitioned to carry out similar functions to those described herein. As an example, each of the modules 242, 244, 246, 248, 250, 252 may be implemented with processing architecture such as a processor 232 and memory 243, as well as suitable communication interfaces. For example, the controller 110 may implement the modules 242, 244, 246, 248, 250, 252 with the processor 232 based on programs or instructions stored in memory 242, including one or more maps or other data structures 236, 238, 240.

As can be appreciated, the controller 110 shown in FIG. 4 may be configured to output one or more control signals in the form of piston actuation commands to the piston actuation arrangement 190, e.g., to modify the compression ratio of the piston-cylinder sets 122a to support ignition, combustion, and/or other performance parameters, including implementation of the auto-ignition assistance mode and the nominal mode, introduced above. In some examples, the consideration and implementation of the auto-ignition assistance mode and the nominal mode by the controller 110 are continuous, e.g., constantly active. In other examples, the activation of the auto-ignition assistance mode and the nominal mode may be selective, e.g., enabled or disabled based on input from the operator or other considerations. In any event, such modes may be enabled and implemented as described below.

As introduced above, the controller 110 may be organized to receive input from one or more sensors 186a-186i. In particular, an ambient module 242 may receive, condition, and/or evaluate information associated with the ambient conditions from the ambient pressure sensor 186f and ambient temperature sensor 186g; a load module 244 may receive, condition, and/or evaluate information associated with the demanded load as load input 186h; and a TDC temperature module 246 may receive, condition, and/or evaluate information associated with the exhaust manifold pressure sensor 186a, the intake manifold pressure sensor 186c, the intake manifold temperature sensor 186d, the coolant temperature sensor 186e, and the EGR sensor 186i. As noted, one or more of these sensors may be omitted and/or such data may be derived from other sources.

Generally, in one example, the ambient module 242 conditions and/or provides the ambient pressure and the ambient temperature to a dynamic modification module 248, and similarly, the load module 244 conditions and/or provides the load demand to the dynamic modification module 248. The TDC temperature module 246 functions to estimate or otherwise determine a combustion chamber temperature when the piston is at a top dead center (TDC) position.

The combustion chamber temperature at top dead center (TDC) (or, generally, the "TDC temperature") may be calculated or derived in any suitable manner. In one example, the TDC temperature may be a function of intake manifold temperature, the exhaust manifold pressure, the nature of the heat transfer to and from the combustion chamber, and the properties of the gas within the intake manifold. The intake manifold temperature and the exhaust manifold pressure may be respectively derived and/or determined from the information provided by the intake manifold temperature sensor 186d and the exhaust manifold pressure sensor 186a; and the nature of the heat transfer may be derived from the coolant temperature information provided by the coolant temperature sensor 186e.

The properties of the intake manifold gas may include the relative percentages of the $O_2$, $N_2$, $CO_2$, and $H_2O$, which may be derived from the EGR rate (e.g., based on information provided by the EGR sensor 186i) and the hydrocarbon ratio of the fuel (e.g., which may be a preset value according to fuel type and/or determined based on information from a sensor). In one example, the TDC temperature module 246 may determine the polytropic coefficient (k) of the intake gas based on the weighted averages of the constituent components (e.g., $O_2$ and $N_2$, each with a polytropic coefficient of approximately 1.4; $CO_2$ with a polytropic coefficient of approximately 1.29; and $H_2O$ with a polytropic coefficient of approximately 1.28).

In one example, the TDC temperature module 246 may calculate the TDC temperature according to the following formula (1):

$$T_{TDC} = T_{BDC} * \left[\left(\frac{V_{TDC}}{V_{BDC}}\right)^{1-k}\right] \quad (1)$$

wherein, $T_{TOC}$ is the TDC temperature;

$T_{BDC}$ is the BDC temperature;

$V_{TDC}$ is the TDC volume;
$V_{BDC}$ is the BDC volume; and
k is the polytropic coefficient.

As noted above, the polytropic coefficient (k) may be determined based on the ratios of gas constituents derived from the percentage of EGR gas and the hydrocarbon ratio of the fuel. The volumes of the combustion chamber within the piston-cylinder set at top dead center ($V_{TDC}$) and at bottom dead center ($V_{BDC}$) may be derived based on known physical values or parameters of the piston cylinder sets and the present position of the piston actuation arrangement.

The BDC temperature (TBDC) may be determined according to the following formula (2):

$$T_{BDC} = T_{IM} + \Delta T_{HT} + \Delta T_{RG} \quad (2)$$

wherein,
$T_{IM}$ is the gas temperature in the intake manifold;
$\Delta T_{HT}$ is the change in temperature due to heat transfer out of the combustion chamber; and
$\Delta T_{RG}$ is the temperature change due to the percentage of residual gas remaining in the cylinder.

Generally, the change in temperature due to heat transfer ($\Delta T_{HT}$) is a function of the engine coolant temperature (e.g., from the coolant temperature sensor 186e), intake manifold temperature (e.g., from the intake manifold temperature sensor 186d), and intake manifold pressure (e.g., from the intake manifold pressure sensor 186c). In one example, the function to calculate the heat transfer ($\Delta T_{HT}$) may be in the form of either calibrated equations and/or a calibrated look-up table (e.g., as part of engine maps 240). Moreover, the temperature change due to residual gas ($\Delta T_{RG}$) may be a function of exhaust manifold pressure (e.g., from the exhaust manifold pressure sensor 186a) and intake manifold pressure (e.g., from the intake manifold pressure sensor 186c). As above, in one example, the function to calculate the temperature change due to residual gas ($\Delta T_{RG}$) may be in the form of either calibrated equations and/or a calibrated look-up table (e.g., as part of engine maps 240). Upon completion of the calculation, the TDC temperature module 246 provides the TDC temperature to the dynamic modification module 248.

Initially, the dynamic modification module 248 evaluates the ambient temperature and the ambient pressure. If the ambient temperature and the ambient pressure are greater than respective temperature and pressure limits or thresholds (which may be stored, for example, in engine maps 240 as preset or derived values), the dynamic modification module 248 evaluates the load demand relative to a load limit or threshold (which may be stored, for example, in engine maps 240 as preset or derived values). In this evaluation, if the load demand is greater than a load limit, the dynamic modification module 248 generates commands to activate the nominal module 250, e.g., for operation in the nominal mode; and if the load demand is not greater than a load limit, the dynamic modification module 248 generates commands to activate the auto-ignition assistance module 252, e.g., for operation in the auto-ignition assistance mode.

If the ambient temperature and the ambient pressure are greater than respective temperature and pressure limits (which may be stored, for example, in engine maps 240 as preset or derived values), the dynamic modification module 248 evaluates the TDC temperature relative to a TDC temperature limit or threshold (which may be stored, for example, in engine maps 240 as preset or derived values). In this evaluation, if the TDC temperature is greater than a TDC temperature limit, the dynamic modification module 248 generates commands to activate the nominal module 250, e.g., for operation in the nominal mode; and if the TDC temperature is not greater than a TDC temperature limit, the dynamic modification module 248 generates commands to activate the auto-ignition assistance module 252, e.g., for operation in the auto-ignition assistance mode.

In the nominal mode, the nominal module 250 generates commands for the piston actuation arrangement 190 based on a nominal mode calibration map 236 based on various parameters, including air fuel ratio, EGR characteristics, and timing requirements in order to result in appropriate piston positions. Generally, as noted above, the nominal mode is enabled when the load and/or temperature conditions are sufficient to auto-ignite the relatively low cetane fuel, such that fuel efficiency and/or performance characteristics may be prioritized. As an example, the piston actuation arrangement 190 may be positioned to result in a relatively low compression ratio such as shown in FIG. 3B, discussed above.

In the auto-ignition assistance mode, the auto-ignition assistance module 252 generates commands for the piston actuation arrangement 190 based on an auto-ignition assistance mode calibration map 238 based on various parameters, including air fuel ratio, EGR characteristics, and timing requirements in order to result in appropriate piston positions. Generally, as noted above, the auto-ignition assistance mode is enabled when the load and/or temperature conditions are otherwise insufficient to auto-ignite the relatively low cetane fuel, such that characteristics that would otherwise be prioritized are temporarily sacrificed in order to provide a more robust ignition and combustion. As an example, the piston actuation arrangement may be positioned to result in a relatively high compression ratio such as shown in FIG. 3A, discussed above.

Accordingly, the power systems discussed above provide the ability to use ethanol and other low cetane fuels in a diesel-type, compression ignition engine over a range of conditions, including cold starts and low load conditions. Overall, the power systems described herein result in a platform architecture that may provide improved fuel consumption, higher performance, and reduced criteria pollutants over a relatively wide temperature operating window. As noted, the piston actuation arrangement provides a variable compression ratio that enables the use of low cetane fuels over a range of conditions.

As will be appreciated by one skilled in the art, certain aspects of the disclosed subject matter may be embodied as a method, system (e.g., a work vehicle control or power system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power system for a work vehicle, comprising:
   an intake arrangement configured to intake charge air;
   a compression ignition engine including:
      a plurality of piston-cylinder sets configured to receive, ignite, and combust intake gas that includes the charge air from the intake arrangement to generate mechanical power and exhaust gas, wherein at least a first piston-cylinder set of the piston-cylinder sets includes:
         a cylinder defining an intake port and an exhaust port;
         a piston positioned at least partially within the cylinder to from a combustion chamber in between that defines a compression ratio, the combustion chamber being in fluid communication with the intake port and the exhaust port;
         an intake valve configured to open and close the intake port;
         an exhaust valve configured to open and close the exhaust port; and
         a fuel injector configured to inject fuel into the combustion chamber; and
      a plurality of piston actuation arrangements, including a first piston actuation arrangement coupled to the piston of the first piston-cylinder set and configured to be repositioned to dynamically modify the compression ratio of the first piston-cylinder set;
   an exhaust sensor configured to sense a temperature of the exhaust gas; and
   a controller coupled to command the first piston actuation arrangement such that,
      in an auto-ignition assistance mode, the first piston actuation arrangement places the first piston into a first configuration resulting in a first compression ratio; and
      in a nominal mode, the first piston actuation arrangement places the first piston into a second configuration resulting a second compression ratio that is lower than the first compression ratio;
      wherein the controller is configured to command the first piston actuation arrangement to adjust the first piston-cylinder set between the first compression ratio and the second compression ratio based on signals from the exhaust sensor associated with the exhaust gas temperature.

2. The power system of claim 1, wherein the compression ignition engine is configured to operate with a low cetane fuel.

3. The power system of claim 1, wherein the compression ignition engine is configured to operate with a low cetane fuel having a cetane value of less than 40.

4. The power system of claim 3, wherein the first compression ratio of the first piston-cylinder set in the auto-ignition assistance mode is sufficient to auto-ignite the low cetane fuel.

5. The power system of claim 3, wherein the first compression ratio of the first piston-cylinder set in the auto-ignition assistance mode is sufficient to result in a temperature within the combustion chamber of at least 800° C. independent of operating conditions.

6. The power system of claim 1, wherein the controller is configured to command the first piston actuation arrangement to adjust the first piston-cylinder set between the first compression ratio and the second compression ratio based on ambient temperature.

7. The power system of claim 1, wherein the controller is configured to command the first piston actuation arrangement to adjust the first piston-cylinder set between the first compression ratio and the second compression ratio based on intake temperature.

8. The power system of claim 1, wherein the controller is configured to command the first piston actuation arrangement to adjust the first piston-cylinder set between the first compression ratio and the second compression ratio based on engine load.

9. The power system of claim 1, wherein the controller is configured to command the first piston actuation arrangement to place or maintain the first piston-cylinder set at the first compression ratio during start-up in the auto-ignition assistance mode.

10. A work vehicle, comprising:
    a chassis;
    a drive assembly supported on the chassis;
    a power system supported on the chassis and configured to power the drive assembly, the power system comprising:
        an intake arrangement configured to intake charge air; and
        a compression ignition engine including:
            a plurality of piston-cylinder sets configured to receive, ignite, and combust intake gas that includes the charge air from the intake arrangement to generate mechanical power and exhaust gas, wherein at least a first piston-cylinder set of the piston-cylinder sets includes:
                a cylinder defining an intake port and an exhaust port;
                a piston positioned at least partially within the cylinder to from a combustion chamber in between that defines a compression ratio, the combustion chamber being in fluid communication with the intake port and the exhaust port;
            an intake valve configured to open and close the intake port;
            an exhaust valve configured to open and close the exhaust port; and
            a fuel injector configured to inject fuel into the combustion chamber; and
        a plurality of piston actuation arrangements, including a first piston actuation arrangement coupled to the piston of the first piston-cylinder set and configured to be repositioned to dynamically modify the compression ratio of the first piston-cylinder set;
        an exhaust sensor configured to sense a temperature of the exhaust gas; and
        a controller coupled to command the first piston actuation arrangement such that,
            in an auto-ignition assistance mode, the first piston actuation arrangement places the first piston into a first configuration resulting in a first compression ratio; and
            in a nominal mode, the first piston actuation arrangement places the first piston into a second configuration resulting a second compression ratio that is lower than the first compression ratio;
        wherein the controller is configured to command the first piston actuation arrangement to adjust the first piston-cylinder set between the first compression ratio and the second compression ratio based on signals from the exhaust sensor associated with the exhaust gas temperature.

11. The work vehicle of claim 10, wherein the compression ignition engine is configured to operate with a low cetane fuel.

12. The work vehicle of claim 10, wherein the compression ignition engine is configured to operate with fuel having a cetane value of less than 40.

13. The work vehicle of claim 12, wherein the first compression ratio of the first piston-cylinder set in the auto-ignition assistance mode is sufficient to auto-ignite the low cetane fuel.

14. The work vehicle of claim 12, wherein the first compression ratio of the first piston-cylinder set in the auto-ignition assistance mode is sufficient to result in a temperature within the combustion chamber of at least 800° C. independent of operating conditions.

15. The work vehicle of claim 10, wherein the controller is configured to command the first piston actuation arrangement to adjust the first piston-cylinder set between the first compression ratio and the second compression ratio based on ambient temperature.

16. The work vehicle of claim 10, wherein the controller is configured to command the first piston actuation arrangement to adjust the first piston-cylinder set between the first compression ratio and the second compression ratio based on intake temperature.

17. The work vehicle of claim 10, wherein the controller is configured to command the first piston actuation arrangement to adjust the first piston-cylinder set between the first compression ratio and the second compression ratio based on engine load.

18. The work vehicle of claim 10, wherein the controller is configured to command the first piston actuation arrangement to place or maintain the first piston-cylinder set at the first compression ratio during start-up in the auto-ignition assistance mode.

* * * * *